June 21, 1927.  E. R. BURTNETT  1,632,879
INTERNAL COMBUSTION ENGINE
Filed Feb. 4, 1924   2 Sheets-Sheet 1
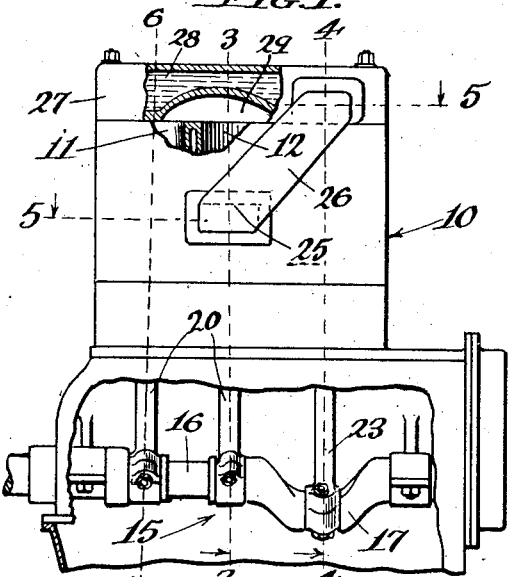
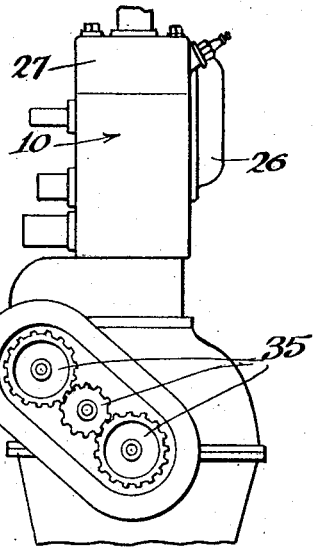
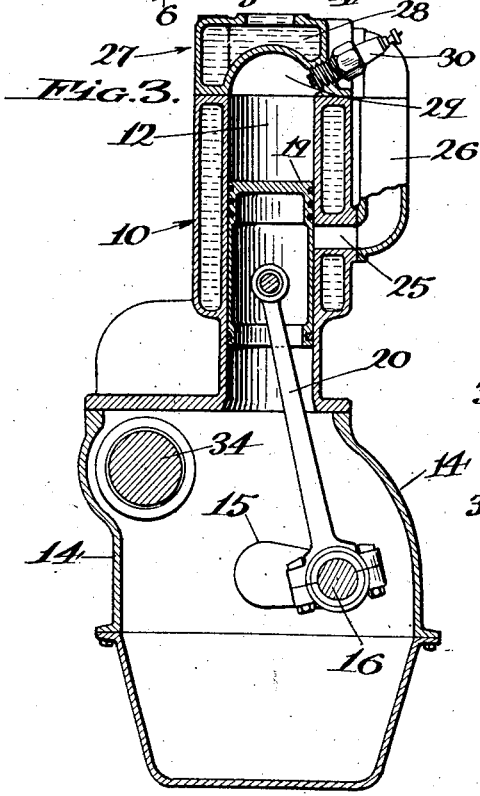
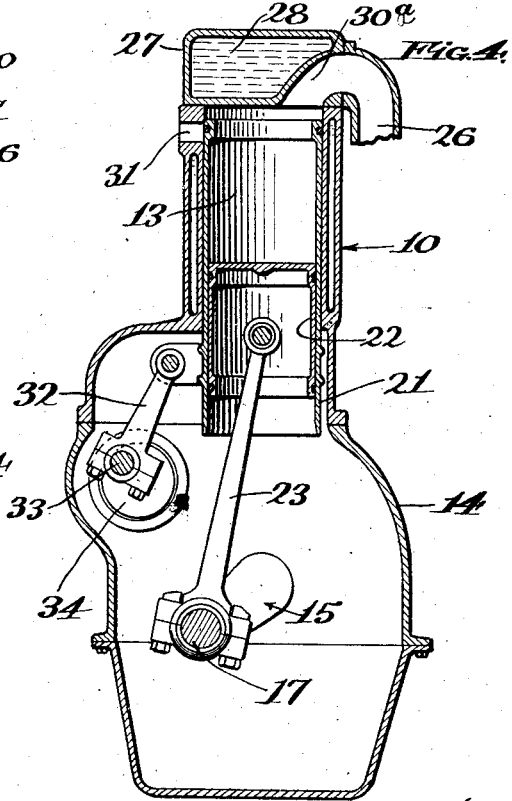
Inventor:
Everett R. Burtnett
By Martin C. Smith, Attorney.

June 21, 1927.
E. R. BURTNETT
1,632,879
INTERNAL COMBUSTION ENGINE
Filed Feb. 4, 1924
2 Sheets-Sheet 2
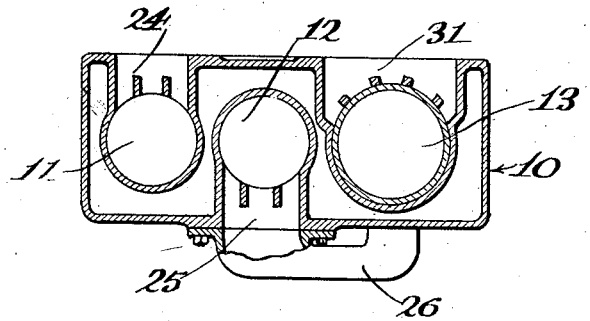
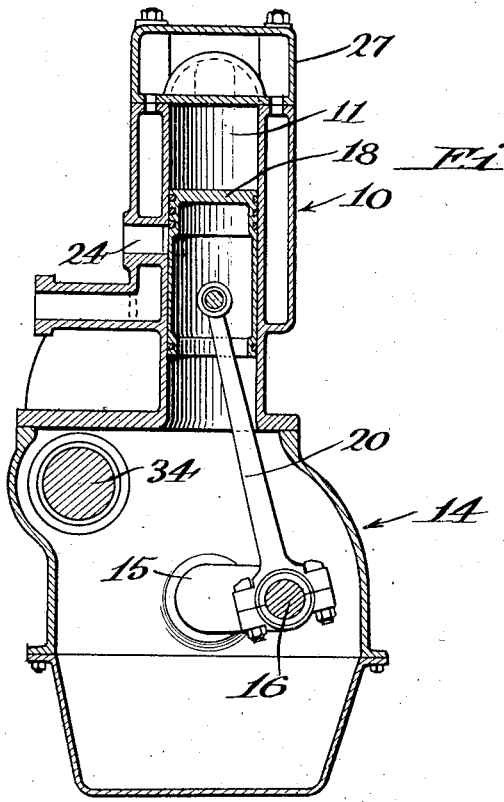

Patented June 21, 1927.

1,632,879

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed February 4, 1924. Serial No. 690,648.

My invention relates to an internal combustion engine of the two stroke cycle type, and has for its principal objects, the provision of a relatively simple engine structure wherein two combustion cylinders that are joined by a clearance chamber common to both, has combined therewith, a pumping cylinder wherein gaseous fuel is compressed and inducted under pressure into the combustion cylinders and said pumping cylinder having associated therewith a sleeve that functions as a valve for controlling the admission of gaseous fuel into said pumping cylinder; to provide a two stroke cycle engine of the character referred to, in which very high compression can be accomplished and made use of, without bringing about detonation, and its undesirable and destructive results and further, to provide an engine that has great strength and durability, is practically silent in operation, capable of being easily and cheaply produced and in which, the port capacity is very great as compared to the volume of cylinder displacement.
With the foregoing and other objects in view, my invention consists in certain novel features of construction and arrangement of parts that will be hereinafter more fully described and claimed and illustrated in the accompanying drawings in which:

Fig. 1 is a side elevational view of my improved engine with the crank case broken away to show the crank therein.

Fig. 2 is an end elevational view of the engine.

Fig. 3 is an enlarged vertical section taken on the line 3—3 of Fig. 1.

Fig. 4 is an enlarged vertical section taken on the line 4—4 of Fig. 1.
Fig. 5 is a horizontal section taken on the line 5—5 of Fig. 1.

Fig. 6 is an enlarged vertical section taken on the line 6—6 of Fig. 1.

Referring by numerals to the accompanying drawings, which illustrate a practical embodiment of my invention, 10 designates a cylinder block, preferably of the water jacketed type and in which is formed a pair of combustion chambers 11 and 12 and a gaseous fuel pumping or precompression chamber 13. These chambers are, as shown, preferably arranged in a row, with their axes parallel and occupying the same plane.

Block 10 surmounts a crank case 14, formed in two or more parts and provided with suitably arranged bearings for a crank shaft 15. This crank shaft has a crank 16 that is located beneath the combustion chambers 11 and 12 and with a crank 17 that is located beneath pumping chamber 13.

Crank 16 is approximately 225 degrees in advance of crank 17, in the direction of crank rotation.

Arranged for operation within chambers 11 and 12 are, respectively, pistons 18 and 19 and connecting said pistons and crank 16 are ordinary connecting rods 20.

Arranged for reciprocatory movement within pumping chamber 13, is an openended sleeve 21 and arranged for reciprocatory movement therein is a pumping piston 22 that is connected to crank 17 by an ordinary connecting rod 23.

Formed through the wall of block 10 and communicating with the intermediate portion of chamber 11 is an exhaust port 24 that is wholly uncovered and open only when piston 18 is at the lower or outer end of its stroke.

Formed through the wall of block 10 and communicating with the intermediate portion of chamber 12 is a compressed gaseous fuel inlet port 25 that is wholly uncovered and open, only when the piston 19 is at the lower or outer end of its stroke and communicating with said port 25 is the lower end of an inclined gaseous fuel transfer duct 26.

Secured on top of block 10 is a head block 27, that has a cooling fluid circulating chamber 28, and formed in the underside thereof is a pocket or recess 29 that establishes communication between the upper ends of chambers 11 and 12 and said recess performing the functions of a common clearance chamber for the two combustion chambers as well as a combined compression, ignition, combustion and expansion chamber.

Seated in block 27 and preferably at a point above chamber 12, is a spark plug 30 and the inner ends of the electrodes thereof project into the chamber 29.

Formed in the under side of head block 29 and communicating with chamber 13 is a short outlet passageway 30$^a$ that leads through the side of said head block and communicates directly with the upper end of transfer duct 26.

Formed through the wall of block 10 and communicating with the upper portion of chamber 13 is a gaseous fuel inlet duct 31 that is uncovered and open as sleeve 21 moves on its downward or outward stroke.

The upper portion of the sleeve carries one or more packing rings that bear against the inner surface of the wall surrounding chamber 13 to provide a leak-proof joint and pivotally connected to the lower portion of said sleeve is the upper end of a connecting rod 32, the lower end of which is journalled on the crank 33 of a shaft 34.

This crank shaft 34 is journalled in suitably located in the crank case and it is driven at the same speed and synchronously with crank shaft 15, by gearing such as 35, or by any suitable driving mechanism.

In the operation of my improved engine, gaseous fuel, from a suitable source of supply is drawn into pumping chamber 13 as the piston therein moves downward on its suction stroke and while inlet port 31 is uncovered and open, it being understood that sleeve valve 21 that controls said port 31 is reciprocated in proper time relation to piston 22 by crank 33 and connecting rod 32.

Sleeve 21 moves upward to close port 31 slightly in advance of the upward stroke of piston 22 and as the latter moves upward, the gaseous fuel charge is compressed within the upper portion of chamber 13 and in transfer duct 26.

As pumping piston 22 approaches and passes high center, piston 19 in chamber 12 passes below and uncovers port 25 and simultaneously, piston 18 passes below and uncovers exhaust port 24. As a matter of fact, the exhaust port 24 starts to open or is uncovered slightly in advance of the uncovering of port 25 due to the fact that said exhaust port is slightly wider than said port 25.

Thus as transfer port is uncovered, the compressed gaseous fuel will rush into and through chamber 12, thence through connecting chamber 29 and thence downward through chamber 11 and, in so doing, the inrush of gaseous fuel drives before it, the burnt gases and products of combustion from the previously ignited charge and these burnt gases find exit from chamber 11 through exhaust port 24.

It will be understood that pistons 18 and 19 operate simultaneously, inasmuch as they are connected to the same crank and, as said pistons start to move upward, inlet port 25 and exhaust port 24 are closed and during the remaining portion of the upward stroke of said pistons, the charge of gaseous fuel admitted to the combustion chambers 11 and 12 and whatever residual products of combustion remain in said chambers will be compressed in the upper portions of said combustion chambers and in the common clearance chamber 29.

As the pistons 18 and 19 pass high center or immediately thereafter, the compressed gaseous fuel charge will be ignited by a spark produced between the terminals of the electrodes of plug 30 and the expansion attending combustion of the ignited charge will drive the pistons downward on their power stroke, and the power and motion thus produced will be transmitted directly to the crank shaft 15.

Thus it will be seen that I have provided a relatively simple, strong, rugged and durable two stroke cycle combustion engine unit that embodies a pair of connected combustion chambers, a gaseous fuel pumping cylinder and a sleeve valve for controlling the admission of gaseous fuel into the pumping cylinder and which engine may be operated under high compression with producing detonation and its deleterious results.

It will be understood that minor changes in the size, form and construction of the various parts of my improved engine may be made and substituted for those herein described without departing from the spirit of the invention, the scope of which is set forth in the appended claims.

I claim as my invention:

1. In an internal combustion engine, the combination of a combustion unit and a pumping unit, the combustion unit consisting of two cylinders joined at their head ends by a common compression and combustion clearance chamber and a piston within each of the two combustion cylinders, the pumping unit consisting of a single cylinder, the three cylinders being arranged in a row with their axes parallel, a charge volume inlet port leading from the chamber in the pumping cylinder to the chamber in the adjacent combustion cylinder, said pumping cylinder being provided with a gaseous fuel inlet port, a sleeve arranged for operation within the pumping cylinder, a piston arranged for operation within the sleeve in said pumping cylinder, a crank shaft, connections between the pistons in the three cylinders and said crank shaft, means for reciprocating said sleeve in time relation of one to one to the crank shaft and the crank throws of said crank shaft to which the piston in the pumping cylinder is connected being angularly disposed relative to the crank to which the pistons in the combustion cylinders are connected so as to cause the pumping piston to reach head end dead center as the inlet port between the pumping chamber and combustion chamber has been closed and as the sleeve valve opens the gaseous fuel inlet port to the pumping chamber.

2. In an internal combustion engine, two cylinders, the chamber thereof being joined at the head end by a single clearance chamber, the said clearance chamber being common to each of the two cylinders as a compression, ignition, combustion and expansion chamber, pistons within each of the cylinders commonly joined by the said combustion chamber, a pump cylinder the axes of the three cylinders being arranged parallel with each other and in the same plane, a sleeve within said pump cylinder, a piston arranged for operation within the sleeve of the pump cylinder, a crank shaft having two cranks, one of which is disposed substantially 225° in advance of the other in the direction of crank rotation, there being ports formed in the wall of the said pump cylinder and controlled by the said sleeve within the pump cylinder for the admission of gaseous mixture into the pump cylinder, a driving connection between the sleeve and the working parts of the engine whereby the sleeve is caused to operate in time ratio one to one with the piston operating within said sleeve, a transfer duct leading from the clearance chamber of the pump cylinder to one of the two cylinders joined by the clearance chamber common to both and there being exhaust ports formed in the wall of the other of the two cylinders joined by the said common clearance chamber.

3. In an internal combustion engine, a two stroke cycle function unit, two combustion cylinders, each having ports formed in their respective walls and each of the cylindrical chambers formed within the two cylinders being joined with the other at the head end by a connecting chamber, a piston arranged for operation within each of the said two combustion cylinders, a crank shaft, the said two pistons of the combustion cylinders being separately connected to said crank shaft, a third cylinder the axes of the three cylinders being arranged parallel with each other and in the same plane, a sleeve arranged for operation within said third cylinder, a third piston separately connected to the crankshaft and arranged for operation within said sleeve, the crank to which the two combustion pistons are connected being disposed substantially 225° in advance of the other crank, in the direction of crank rotation, there being ports formed in the wall of the third cylinder for the admission of gaseous fuel mixture, the sleeve within the third cylinder arranged so as to function as a valve for opening and closing said admission ports of the third cylinder, a cylinder head common to each of the three cylinders, an arrangement of the cranks of the crank shaft, whereby the piston of the third cylinder pumps a charge of fresh gas into the two cylinder chambers joined by the common clearance chamber, once each revolution of the crank shaft and means for operating the sleeve, whereby the ports of the third cylinder are opened for the full duration of each suction stroke of the piston within the sleeve and the third cylinder successively.

In testimony whereof I affix my signature.

EVERETT R. BURTNETT.